United States Patent [19]

Scialla et al.

[11] Patent Number: 5,559,090
[45] Date of Patent: Sep. 24, 1996

[54] STABLE, HYDROGEN PEROXIDE-CONTAINING BLEACHING COMPOSITIONS

[75] Inventors: Stefano Scialla; Sergio Cardola, both of Rome, Italy

[73] Assignee: The Procter & Gamble Company, Cincinnati, Ohio

[21] Appl. No.: 157,200

[22] PCT Filed: Jun. 8, 1992

[86] PCT No.: PCT/US92/04774

§ 371 Date: Sep. 22, 1994

§ 102(e) Date: Sep. 22, 1994

[87] PCT Pub. No.: WO92/22496

PCT Pub. Date: Dec. 23, 1992

[30] Foreign Application Priority Data

Jun. 14, 1991 [EP] European Pat. Off. .............. 91870094

[51] Int. Cl.$^6$ ................................ C11D 1/72; C11D 3/04; C11D 3/395
[52] U.S. Cl. ..................... 510/303; 510/302; 510/307; 510/326; 510/356; 510/361; 510/370
[58] Field of Search .................................. 252/94, 174.21, 252/550, 186.26, 186.28

[56] References Cited

U.S. PATENT DOCUMENTS

| | | | |
|---|---|---|---|
| 2,886,532 | 5/1959 | Richmond et al. | 252/104 |
| 3,970,575 | 7/1976 | Barrett, Jr. | 252/95 |
| 4,238,192 | 12/1980 | Kandathil | 252/95 |
| 4,430,236 | 2/1984 | Franks | 252/95 |
| 4,457,760 | 7/1984 | Cholley | 8/111 |
| 4,536,182 | 8/1985 | Tatin | 8/107 |
| 4,613,448 | 9/1986 | Cheng | 252/157 |
| 4,619,663 | 10/1986 | Tatin | 8/107 |
| 4,744,968 | 5/1988 | Malin et al. | 423/272 |
| 4,844,710 | 7/1989 | Guth et al. | 8/127.1 |
| 4,900,468 | 2/1990 | Mitchell et al. | 252/95 |
| 4,988,451 | 1/1991 | Nunn et al. | 252/95 |
| 5,316,691 | 5/1994 | Sone et al. | 252/174.12 |
| 5,318,715 | 6/1994 | Krishnan | 252/99 |
| 5,372,740 | 12/1994 | Fair et al. | 252/135 |

OTHER PUBLICATIONS

1985 International McCutcheon's Emulsifier's & Detergents, The Manufacturing Confectioner Publishing Co., 1985, p. 189.

*Primary Examiner*—Douglas J. McGinty
*Assistant Examiner*—Gregory R. Delcotto
*Attorney, Agent, or Firm*—Thomas G. Krivulka; T. David Reed

[57] ABSTRACT

Aqueous acidic bleaching compositions are described which comprise hydrogen peroxide and a specific class of surfactants which stabilize hydrogen peroxide.

16 Claims, No Drawings

STABLE, HYDROGEN PEROXIDE-CONTAINING BLEACHING COMPOSITIONS

TECHNICAL FIELD

The present invention relates to aqueous bleaching compositions, for laundry or hard surfaces. The compositions according to the present invention, which comprise hydrogen peroxide, are stable upon storage and have reduced tendency to foam.

BACKGROUND

Aqueous, hydrogen peroxide-containing compositions are well known in the art. In such compositions, the hydrogen peroxide spontaneously tends to undergo a decomposition process whereby the available oxygen in the composition, thus its bleaching power, decreases with time. This decomposition process particularly represents a problem in bleaching compositions for consumer use, since these compositions need to have a long life time, in order to retain their original characteristics throughout shipping, shelf and home storage. The self-decomposition process of hydrogen peroxide increases with temperature, thus this problem is even more acute in warm climate countries.

Also, it has been observed that hydrogen peroxide-containing compositions produce heaving foaming during their manufacturing process and their use; thus, these compositions typically need foam regulating compounds, typically silicone-based compounds, which are detrimental to the hydrogen peroxide's stability, and which increase the composition's manufacturing cost.

It is thus an object of the present invention to formulate an aqueous bleaching composition, which comprises hydrogen peroxide and which is stable during long periods of storage.

It is another object of the present invention to provide aqueous bleaching compositions comprising hydrogen peroxide which produce little foaming during their manufacture and use.

It has now been found that these objects could be effectively and simply met by incorporating in these compositions a specific class of nonionic surfactants. These surfactants have indeed been found to produce a stabilizing effect on hydrogen peroxide as well as a foam regulating effect. Other objects and advantages of the present invention will appear from the following description.

J62270509 (abstract) discloses aqueous bleaching compositions comprising hydrogen peroxide, citric acid and a mixture of anionic and nonionic surfactants.

EP 241 137 discloses aqueous bleaching compositions comprising hydrogen peroxide, a bleach activator and surfactants.

EP 276 050 discloses the use of Br or Cl-containing surfactants as anti foaming compounds in aqueous solutions comprising hydrogen peroxide.

U.S. Pat. No. 4,430,236 discloses aqueous bleaching compositions comprising hydrogen peroxide and a mixture of anionic and nonionic surfactants.

U.S. Pat. No. 3,970,575 discloses a bleaching composition comprising hydrogen peroxide, which is stabilized by acidity.

SUMMARY OF THE INVENTION

The compositions according to the invention are aqueous bleaching compositions having a pH of from 2 to 6, which comprise from 1% to 15% by weight of the total composition of hydrogen peroxide and a surfactant system, characterized in that the surfactant system comprises a compound of the formula $$R_1-O-[(R_2O)_n(R_3O)_m]-R_4, \text{ wherein:}$$

—$R_1$ is a $C_{1-25}$ alkyl or alkenyl chain;
—$R_2$ is a $C_{2-4}$ aliphatic hydrocarbon chain;
—$R_3$ is a methyl or ethyl monosubstituted $C_2$–$C_4$ aliphatic hydrocarbon chain;
—$R_4$ is a $C_{1-25}$ alkyl or alkenyl or carboxyl chain, or H;
—n is an integer of from 1 to 10;
—m is an integer of from 1 to 20;
or mixtures thereof.

Preferred compositions additionally comprise from 0.5% to 20% by weight of the total composition of citric acid.

DETAILED DESCRIPTION OF THE INVENTION

The compositions according to the invention are aqueous compositions comprising from 1% to 15% by weight of the total composition of hydrogen peroxide, preferably 2% to 10%, most preferably 3% to 8%.

The compositions according to the present invention further comprise a surfactant system, characterized in that it comprises a compound of the formula $$R_1-O-[(R_2O)_n(R_3O)_m]-R_4, \text{ wherein:}$$

—$R_1$ is a $C_{1-25}$ alkyl or alkenyl chain, preferably $C_{13-15}$, preferably alkyl;
—$R_2$ is a $C_{2-4}$ aliphatic hydrocarbon chain, preferably $C_2$;
—$R_3$ is a methyl or ethyl monosubstituted $C_2$–$C_4$ aliphatic hydrocarbon chain, preferably a methyl substituted ethylene;
—$R_4$ is a $C_{1-25}$ alkyl or alkenyl or carboxyl chain, or H, preferably H;
—n is an integer of from 1 to 10, preferably 1 to 5, most preferably 1;
—m is an integer from 1 to 20; preferably 2 to 10, most preferably 3;
or mixtures thereof.

It is to be understood that, in the chemical formula above, $R_2O$ and $R_3O$ groups may appear in any sequence in the molecule; also, when n and m are greater than 1, different $R_2O$ and $R_3O$ groups may appear in a same molecule.

These compounds have been found to provide a stabilizing effect on the compositions in that the self decomposition of hydrogen peroxide is decreased. Furthermore, these compounds have a regulating effect on the foaming of the compositions. These surfactant compounds are commercially available from ICI under the trade name Ukanil FM®, or from BASF under the trade name Plurafac LF®. The compositions according to the present invention comprise from 0.1% to 30% by weight of the total composition of such surfactants, preferably from 0.5% to 10%, most preferably from 1% to 5%.

The compositions according to the present invention may also comprise additional surfactants such as described in the art. These include anionic, nonionic, cationic and zwitterionic surfactants. Suitable anionics include alkyl benzene sulphonates and alkyl sulphates. Alkyl sulphates surfactants are preferred for use herein because they can be obtained from natural source, e.g coconut, thus they are fully biodegradable; furthermore, it has been observed that anionic surfactants herein may improve the solubility of the surfactant selected according to the present invention for the stabilization of hydrogen peroxide. Further still, using anionic surfactants in the compositions according to the invention can help making a somewhat viscous product, if desired, by using an appropriate level of electrolyte in addition. Indeed, compositions according to the present invention comprising hydrogen peroxide, the surfactant selected hereinabove as well as conventional anionic surfactants and appropriate levels of electrolyte can be made which are viscous, even at low total surfactant level, e.g. about 5%. Accordingly, the compositions according to the present invention preferably comprise from 0.5% to 40% by weight of the total composition of Sodium alkyl sulphate as a co-surfactant, preferably from 1% to 10%, preferably sodium coconut alkyl sulfate.

The compositions according to the invention are acidic and have a pH of from 2 to 6, preferably 3 to 5, most preferably 4. Such pH range can be attained by the addition of appropriate acidifiers such as organic or inorganic acids, acidic salts which buffer pH to an acid value. Examples of suitable acidifiers are sulfuric acid, phosphoric acids, although somewhat undesirable from an environmental viewpoint, hydrochloric acid, phosphonic acid, citric acid, acetic acid, tartaric acid, maleic acid and the like.

In a particularly preferred embodiment of the invention, the compositions comprise from 0.5% to 20% by weight of the total composition of citric acid, preferably from 1% to 10%. Indeed, it has been found there are many benefits obtainable from the addition of citric acid to the compositions according to the present invention, mainly limescale removal performance, but also improved disinfectancy properties and improved bleaching performance. When high levels of citric acid are used to obtain optimal performances, it may be necessary to adjust the pH of the composition by adding an alkalinizing agent such as potassium or sodium hydroxide or ammonia and the like. It is also possible to use citric acid salts such as sodium or potassium salts of citric acid.

The compositions according to the present invention may also comprise conventional ingredients such as solvents, hydrotropes, chelating agents, thickeners, fragrance, dyes and whitening agents, provided all these ingredients are compatible with the compositions. Preferred compositions according to the present invention comprise a fluorescent whitening agent, preferably a distyrylbiphenyl-type whitening agent. Indeed, it has been observed that a mutually hydrotropic effect seems to occur between these whitening agents and the surfactants selected according to the present invention for the stabilization of hydrogen peroxide. Thus the compositions according to the invention preferably comprise from 0.01% to 0.5% by weight of the total composition of such a whitening agent. Such whitening agents are well known in the art and are commercially available for instance from CIBA-GEIGY under the trade name Tinopal®.

The compositions according to the present invention can be made by any process where all ingredients are mixed together. However, in the preferred embodiment where the compositions comprise a substantial amount of citric acid, it is preferred to use a process which comprises the steps of dissolving the citric acid in water separately from the remainder of the composition, adjusting the pH of the citric acid solution to the target pH value of the final composition, and adding said pH-adjusted citric acid solution to the remainder of the composition, the pH of which has been separately set to said target pH value.

It is also preferred, in all cases, to add the hydrogen peroxide as a final step in the process, on top of the remainder of the composition including the citric acid.

EXAMPLE—PART A

The following compositions were made and the available oxygen was measured in the fresh compositions. The compositions were then stored at 50° C. and the available oxygen was measured again after two weeks. The stability of the compositions is expressed as the relative available oxygen loss after storage. The table below lists average values of several replicates.

| Compositions: | 1 | 2 | 3 | 4 | 5 | 6 | 7 |
|---|---|---|---|---|---|---|---|
| | | | | Weight % | | | |
| $H_2O_2$ | 6 | 6 | 6 | 6 | 6 | 6 | 6 |
| Na Coconut Alkyl sulphate | 1 | 2 | 1 | 2 | 1 | 2 | 1 |
| Citric acid | 5 | 5 | 5 | 5 | 5 | 0 | 0 |
| Ukanil ® *1 | 0 | 0 | 0 | 0 | 1 | 0 | 1 |
| Tinopal CBS X ® *2 | 0 | 0 | 0.2 | 0.2 | 0.2 | 0.1 | 0.1 |
| $H_2SO_4$ up to pH | | | | | | 4 | 4 |
| NaOH up to pH | 3 | 3 | 3 | 3 | 3 | | |
| Water & minors | | | | up to 100% | | | |
| % oxygen loss | 10 | 11 | 10 | 11 | 6 | 4 | <1 |

*1 is a surfactant according to the invention from ICI
*2 is a distyryl biphenyl brightener from Ciba Geigy Comments:
— Results for Compositions 1 through 4 show there is little or no difference observed in stability upon modifications in the level of NaCnAS (2 vs 1), of brightener (3 vs 1), brightener and NaCnAS (4 vs 2 and 3).
— Results for composition 5 (vs all others) show the benefits in stability obtained from adding Ukanil R.
— Results for composition 7 vs 6 confirm these benefits, even in less stressful conditions (without citric acid).

EXAMPLES—PART B

Other compositions according to the invention are made which contain the listed ingredients in the listed proportions.

| Compositions | 7 | 8 | 9 | 10 | 11 | 12 |
|---|---|---|---|---|---|---|
| | | | Weight % | | | |
| $H_2O_2$ | 6 | 8 | 8 | 6 | 5 | 5 |
| Na coconut alkyl sulphate | 3.5 | 4 | 1 | 1 | 3 | 1 |
| Citric acid | 6 | 0 | 4 | 7 | 4 | 4 |
| Ukanil ® | 1.5 | 4 | 1 | 1 | 1 | 1 |
| Tinopal CBS X ® | | 0.3 | 0.3 | 0.2 | 0 | 0.2 |
| $NH_3$ up to pH | 4 | | | | 4 | |
| NaOH up to pH | | | 3 | 4 | | 3.5 |
| $H_2SO_4$ up to pH | | 4 | | | | |
| Water & minors | | | up to 100% | | | |

What is claimed is:

1. An aqueous bleaching composition having a pH of from 2 to 6, comprising from 1% to 15% by weight of the total composition of hydrogen peroxide, and comprising a surfactant system, characterized in that the surfactant system comprises a compound of the formula $$R_1-O-[(R_2O)_n(R_3O)_m]-R_4, \text{ wherein:}$$

—$R_1$ is a $C_1$–25 Alkyl or alkenyl group;
—$R_2$ is a $C_{2-4}$ aliphatic hydrocarbon chain;
—$R_3$ is a methyl or ethyl monosubstituted $C_2$–$C_4$ aliphatic hydrocarbon chain;
—$R_4$ is a $C_{1-25}$ alkyl or alkenyl or carboxyl chain; or H;
—n is an integer of from 1 to 10;

—m is an integer of from 1 to 20; or mixtures thereof.

2. A composition according to claim 1, wherein
—$R_1$ is a $C_{13-15}$ alkyl chain;
—$R_2$ is ethylene;
—$R_3$ is a methyl substituted ethylene;
—$R_4$ is H;
—n is an integer of from 1 to 5 most preferably 1;
—m is an integer of from 2 to 10, most preferably 3; or mixtures thereof.

3. A composition according to claim 1 wherein the surfactant system comprises from 0.1 to 30% of said compounds or mixtures thereof, by weight of the total composition.

4. A composition according to claim 3 wherein the surfactant system comprises from 0.5% to 10% of said compounds or mixtures thereof, by weight of the total composition.

5. A composition according to claim 1, wherein the surfactant system further comprises from 0.5% to 40% sodium alkylsulfate, by weight of the total composition.

6. A composition according to claim 5 which comprises from 1% to 10% sodium alkylsulfate, by weight of the total composition.

7. A composition according to claim 1 characterized in that it comprises from 0.5% to 20% citric acid by weight of the total composition.

8. A composition according to claim 1 characterized in that it comprises from 2% to 10% $H_2O_2$, by weight of the total composition.

9. A composition according to claim 1, characterized in that it has a pH in the range of from 3 to 5.

10. A composition according to claim 1 characterized in that it comprises a distyrylbiphenyl fluorescent whitening agent.

11. A process for the manufacturing of a composition according to claim 7 which comprises the steps of dissolving the citric acid in water separately from the remainder of the composition, adjusting the pH of the citric acid solution to the target pH value of the final composition, and adding said pH-adjusted citric acid solution to the remainder of the composition, the pH of which has been separately set to said target pH value.

12. A process according to claim 11 wherein, as a final step, the hydrogen peroxide is added on top of the remainder of the composition including the citric acid.

13. The composition according to claim 4 wherein the surfactant system comprises from 1% to 5% of said compounds or mixtures thereof by weight of the total composition.

14. The composition according to claim 8 wherein the amount of $H_2O_2$ is from about 3% to about 8%.

15. The composition according to claim 9 wherein the pH is about 4.

16. A composition according to claim 7, comprising from 1% to 10% citric acid, by weight of the final composition.

* * * * *